US008250106B2

(12) United States Patent
Kolovski et al.

(10) Patent No.: US 8,250,106 B2
(45) Date of Patent: Aug. 21, 2012

(54) INCREMENTAL INFERENCE

(75) Inventors: Vladimir Kolovski, Nashua, NH (US);
Zhe Wu, Westford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 288 days.

(21) Appl. No.: 12/620,857

(22) Filed: Nov. 18, 2009

(65) Prior Publication Data
US 2011/0119310 A1 May 19, 2011

(51) Int. Cl.
*G06F 17/30* (2006.01)

(52) U.S. Cl. ...................................................... 707/794
(58) Field of Classification Search ............... 707/2, 3, 707/759, 794
See application file for complete search history.

(56) References Cited

U.S. PATENT DOCUMENTS

| 5,970,490 | A | * | 10/1999 | Morgenstern .......................... 1/1 |
| 2006/0235823 | A1 | | 10/2006 | Chong et al. |
| 2007/0233641 | A1 | * | 10/2007 | Chong et al. ........................ 707/2 |
| 2010/0030725 | A1 | * | 2/2010 | Mendis et al. ...................... 707/1 |

OTHER PUBLICATIONS

Agrawal, et al., Direct Algorithms for Computing the Transitive Closure of Database Relations, Proceedings of the 13th VLDB Conference, Brighton 1987, pp. 255-266.
Dong, et al., Maintaining Transitive Closure of Graphs in SQL, pp. 1-23, Intl. Journal of Information Technology, 5 (1): (1999).
Ioannidis, Yannis E., On the Computation of the Transitive Closure of Relational Operators, Proceedings of the Twelfth International Conference on Very Large Data Bases, Kyoto, Japan, Aug. 1986, pp. 403-411.
Pang, et al., Incremental Maintenance of Shortest Distance and Transitive Closure in First-Order Logic and SQL, ACM Transactions on Database Systems, vol. 30, No. 3, Sep. 2005, pp. 698-721.
Wu, et al., Implementing an Inference Engine for RDFS/OWL Constructs and User-Defined Rules in Oracle, pp. 1239-1248, 2008, IEEE 24th International Conference on Data Engineering, 2008.

* cited by examiner

*Primary Examiner* — Etienne Leroux
(74) *Attorney, Agent, or Firm* — Kraguljac Law Group LLC

(57) ABSTRACT

Systems, methods, and other embodiments associated with incremental inference are described. One example method includes updating existing or old triples in a semantic model with triples resulting from the addition of new triples. The updating is performed by separating inference rules into joining steps that are performed on first and second predicates for the inference rule. A first joining step joins results of execution of the first predicate on the new triples with the results of execution the second predicate on the union of the old and new triples to produce newly inferred triples. A second joining step joins results of execution of the first predicate on the union of the old and new triples with the results of execution the second predicate on the new triples to produce newly inferred triples.

27 Claims, 5 Drawing Sheets

INCREMENTAL INFERENCE

BACKGROUND

The evolution of the web to a semantic web is gaining momentum. Resource Description Framework (RDF) is being widely adopted as a standard to capture the semantics of data. Facts represented as RDF (subject, predicate, object) triples can capture both relationships between resources as well as attribute values associated with a resource. A unique challenge of semantic data stores is the ability to automatically derive additional facts based on facts already asserted in the semantic model. These additional facts are derived using inference rules that model the knowledge contained in the existing facts in a process called entailment. With large semantic data models that include many asserted and inferred facts, updating the data model based on new facts by applying the inference rules to the facts in the data model including the new facts becomes a challenge in terms of performance. For example, the addition of 1000 new triples to the LUBM8000 ontology, a benchmark that includes more than a billion triples, may result in 12 hours of processing time spent firing inference rules to derive newly inferred triples that result from the addition of the newly added triples.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
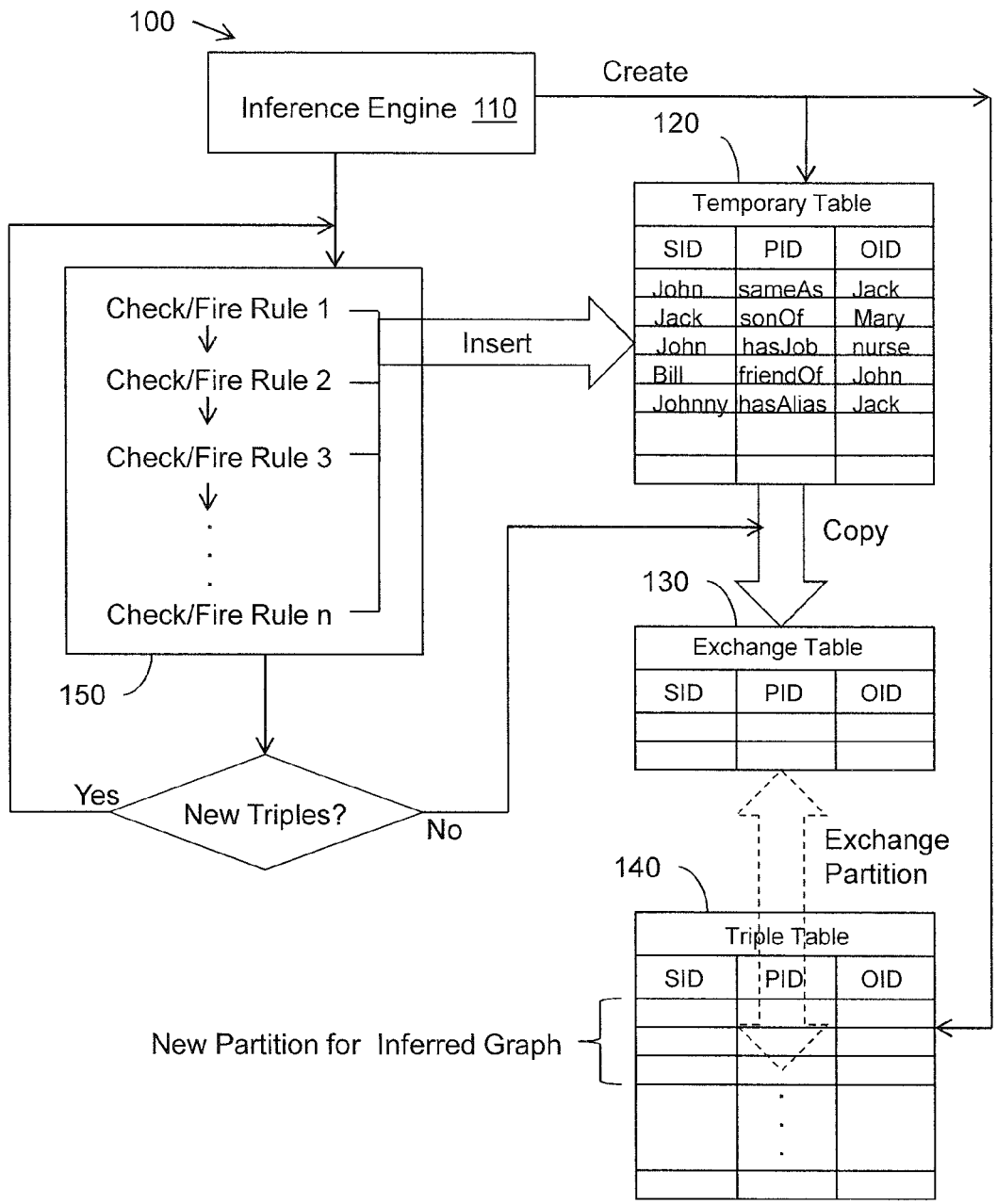
FIG. 1 illustrates an example embodiment of a system associated with incremental inference.

Maintaining the entailed graph (or entailment, from now on) of a semantic data model involves firing the set of inference rules on the entire corpus of triples in the semantic data model, including any new triples added to the model since the last entailment. This is because of the interactions between triples that are the core of the semantic data model. Thus, the addition of a single new triple may require an entailment update that takes as long to complete as the original entailment.

As part of the OWL 2 standardization effort led by the W3C, less expressive OWL subsets have been proposed that have polynomial complexity and are suitable for efficient and scalable reasoning over large datasets. One of these OWL subsets is OWL 2 RL, which is a rule-based profile of OWL 2. Since it is described as a collection of positive Datalog rules, OWL 2 RL can be theoretically implemented on top of semantic stores that already provide rule-based reasoning. OWL 2 RL includes a subset of inference rules that have been used in other models and also provides the capability for a user to add custom rules. These rules include RDF constructs, inverse and functional properties, existential and value restrictions, and owl:intersectionOf. Each of rules can be expressed as a series of joins between tables that select from the asserted and inferred triples in the data model.

One example technique for implementing an inference engine on such semantic data models is to pre-compute and materialize inferred triples using forward chaining, and later use the materialized view for query answering. The forward chaining approach repeatedly fires inference rules on the corpus of asserted and inferred triples in the materialized view until no new facts can be inferred. Other inference techniques apply inference rules at the time of query, which, while saving the memory used in generating inferred triples a priori, can significantly slow query response time. While the pre-computing and materializing of inferred triples will be discussed in the examples herein, it is to be understood that the methods and systems described herein may be applied to any inference technique that involves updating a semantic data model by applying inference rules to a corpus of triples in the semantic data model that includes triples that have been added since the last entailment.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored as computer executable instructions on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL (structured query language), an OQL (object query language), a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

FIG. 1 is a functional block diagram that outlines one example embodiment of an entailment process 100. An inference engine 110 is used to fire a set of inference rules 150 on triples in a semantic data model to create inferred triples. The entailment outlined in FIG. 1 reflects a forward-chaining strategy. The inference process starts with the creation of a new partition in a triple table 140 that stores a materialized view of the subject (SID), property (PID), and object (OID) components of triples in the data model. The new partition will ultimately store the inferred graph (set of inferred triples) that results from the entailment process. A temporary table 120 is also created by the inference engine 110. Like the triple table 140, the temporary table has three columns, SID, PID, OID that together represent a triple. When ancillary information is to be generated by entailment, the temporary table may have additional DISTANCE or PROOF columns.

The core inference logic is driven by the set of inference rules 150. Conceptually, each rule will be executed (fired) during inference and only new (previously nonexistent) triples are added into the temporary table. To execute a rule, matched triples of each antecedent are located and joined based on common variables to produce corresponding consequent triples. For example, a rule that specifies that if a class U is a subclass of X and a resource V is of type U, then V is also of type X would be expressed as part of a semantic model in OWL as follows:

U rdfs:subClassOf X. V rdf:type U→V rdf:type X

A translation of this rule into SQL would be as follows. The presence of two antecedent patterns translates into a 2-way self-join on <IVIEW>, which is an inline view representing the union of triples in the semantic model and newly inferred triples in the temporary table 120. The single common variable U that connects the two triple patterns in the antecedent provides the join condition T1.SID=T2.OID. The NOT EXISTS clause filters out triples already present in <IVIEW>.

```
select distinct T2.SID sid, ID(rdf:type) pid, T1.OID oid
    from <IVIEW> T1, <IVIEW> T2
where T1.PID = ID(rdfs:subClassOf)
    and T2.PID = ID(rdf:type) and T1.SID = T2.OID
    and NOT EXISTS (select 1 from <IVIEW> m
        where m.SID = T2.SID and m.PID = ID(rdf:type) and m.OID =
        T1.OID
```

The SELECT list is formed based upon the triple pattern in the consequent of the rule. The triples returned by the SELECT statement are inserted using an INSERT AS SELECT into the temporary table. Note that the ID( ) function invocations will be replaced with the actual integer IDs to avoid execution time overhead.

In one pass, all rules will be examined; and if no rule generates any new triples, the inference process terminates. All triples from the temporary table 120 are copied into an exchange table 130 that has exactly the same structure as the triple table 140. The exchange table is indexed and exchanged into the newly created partition in the triple table 140. The exchange operation is a virtually zero-time operation because it involves only updating metadata of the tables.

Figure 2:
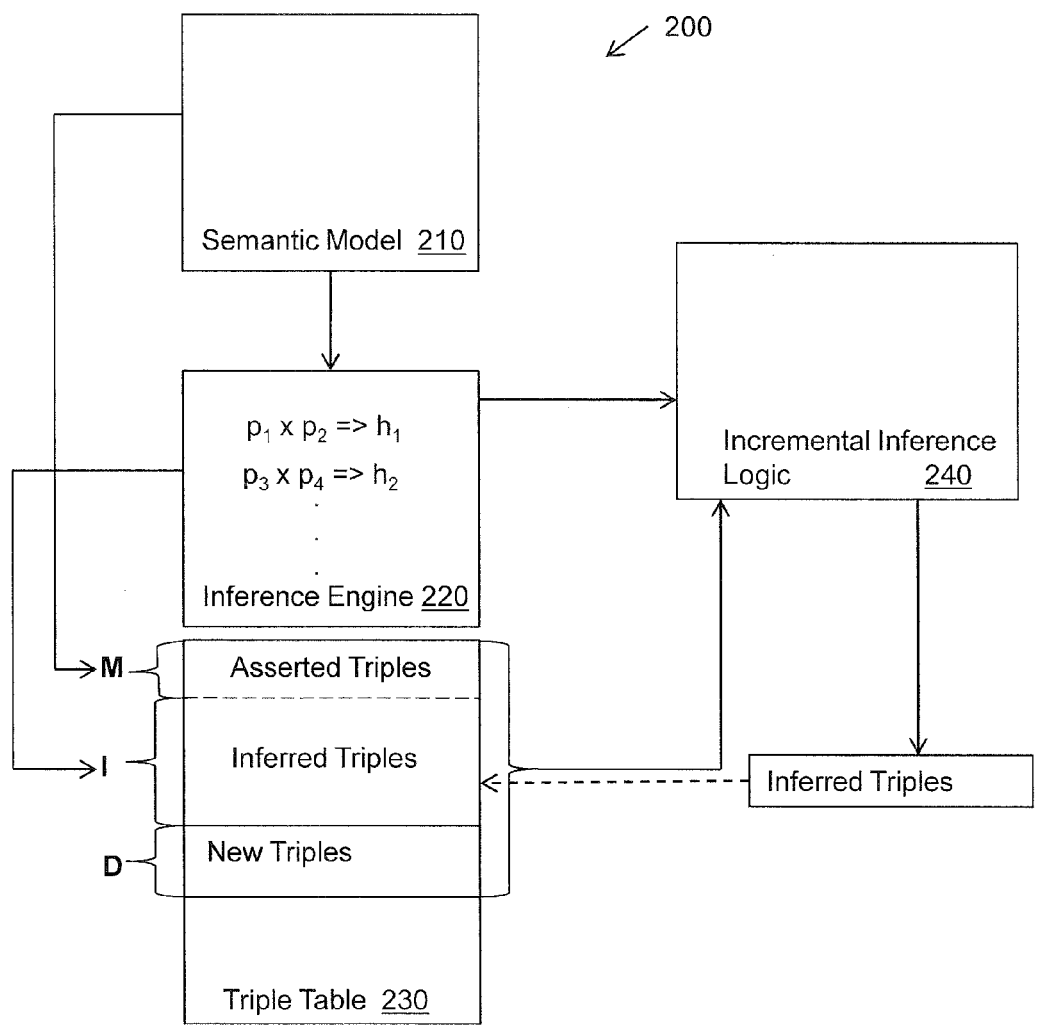
FIG. 2 illustrates another example embodiment of a system associated with incremental inference.

FIG. 2 illustrates an example embodiment of a computing system 200 that performs incremental inference to efficiently perform entailment of a semantic model 210 to which new triples "D" are being added. The semantic model includes "old" triples that include the asserted triples "M" and the inferred triples "I". The old triples M and I are stored in a triple table 230. The semantic model 210 also includes one or more inference rules that will be fired by an inference engine 220. Each inference rule has at least a first predicate and a second predicate. For example, the rule used in the preceding example:

U rdfs:subClassOf X. V rdf:type U→V rdf:type X would have a first predicate $p_1$ corresponding to "U rdfs:subClassOf X" and a second predicate $p_2$ corresponding to "V rdf:type U". Of course, most inference rules will include more than two predicates. However, it will be apparent to one of skill in the art that the examples provided herein with respect to rules having two predicates can easily be extended to apply to rules having more than two predicates.

The computing system includes an incremental inference logic 240 that is configured to update the semantic model with a new set of inferred triples I that reflect the addition of new triples D to the model without re-deriving triples that are already part of the present set of inferred triples I. A naïve approach to updating the semantic model to reflect new triples D would be to evaluate each rule on a union of old and new triples. This could be done by joining the results of each rule predicate as executed on the union of old and new triples. However, this approach would result in much processing time spent re-deriving already existing inferred triples.

To avoid this re-derivation of already existing inferred triples, the incremental inference logic 240 fires the inference rules in multiple join steps. In each join step at least one predicate selects from the new triples D while the other predicate selects from the union of old and new triples ($M_U I_U D$). For each rule, the incremental inference logic 240 applies the rule by joining results of execution of the first predicate on a union of the sets of old and new triples with results of execution of the second predicate on the set of new triples to produce newly inferred triples. The incremental inference logic 240 also joins results of execution of the first predicate on the set of new triples with results of execution of the second predicate on a union of the sets of old and new triples to produce newly inferred triples. For the first rule shown in the inference engine 220 that results in consequent $h_1$, the joining steps performed by the incremental inference logic 240 may be expressed as follows:

$$h \leftarrow p_1^D \times p_2^{(M_U I_U D)} \qquad \text{Join step 1}$$

$$h \leftarrow p_1^{(M_U I_U D)} \times p_2^D \qquad \text{Join step 2}$$

The newly inferred triples produced by the above joining steps are added to the semantic model. The incremental inference logic 240 may also remove newly inferred triples that duplicate old triples after each round of inference rather than removing duplicates after the firing of each rule. The removal of duplicates may be performed in a single query that results in only one join operation. For example, a hash anti-join may be performed between the newly inferred triples from the present inference round and the triples that existed prior to the present inference round. After a round of inference is performed that does not yield any new triples, the incremental inference logic updates the semantic model by replacing the inferred triples I in the semantic model with a new set of inferred triples I that has been generated as described.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
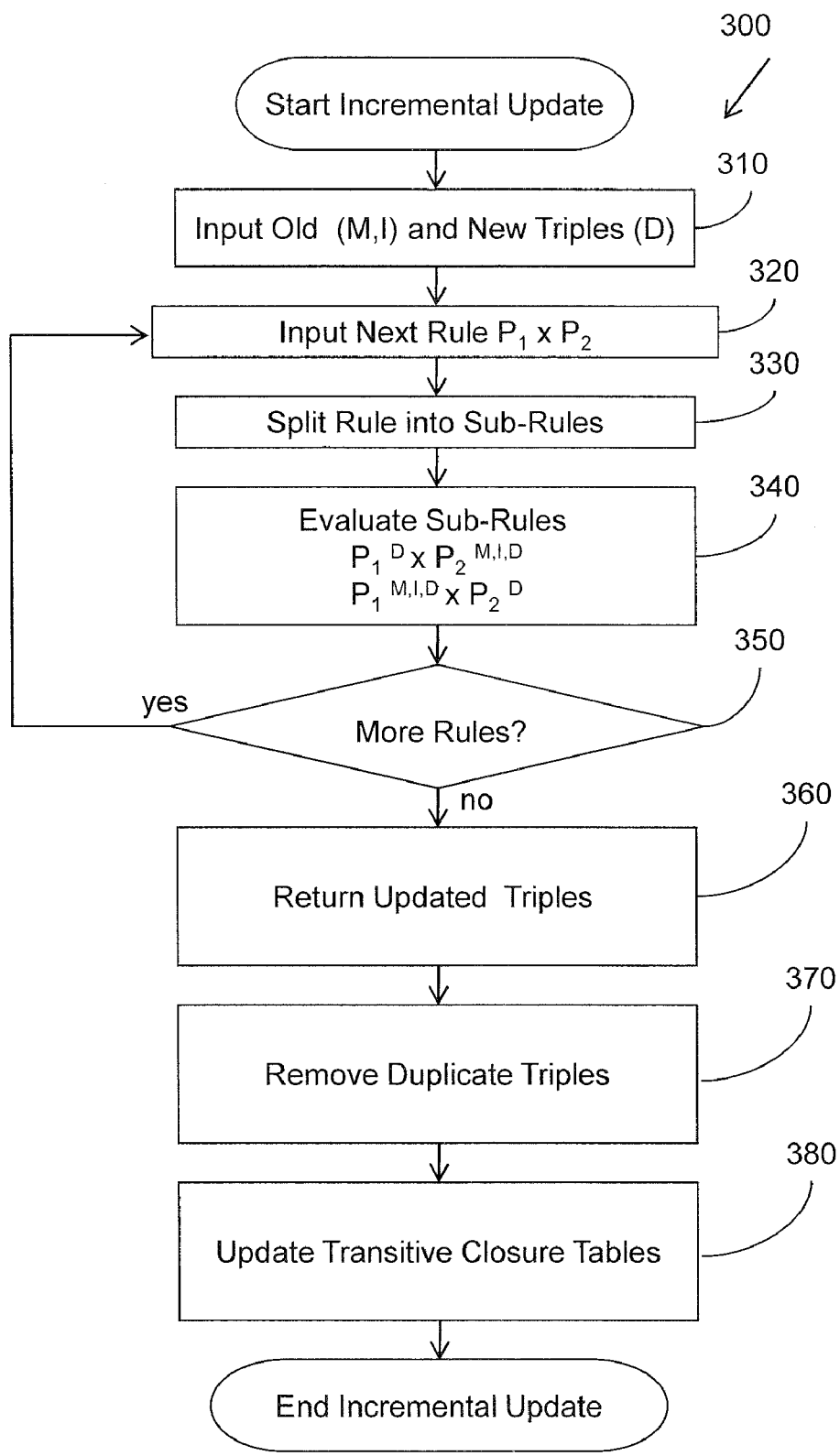
FIG. 3 illustrates an example embodiment of a method associated with incremental inference.

FIG. 3 illustrates an example embodiment of an incremental update method, such as may be performed by the incremental inference logic 240 of FIG. 2. At 310, old triples (M,I) and new triples (D) are input. At 320, as part of an inference round 320-350, a next inference rule is input. The rule is split into sub-rules at 330. The sub-rules include the at least two joining steps using predicates $p_1$ and $p_2$ as described above in connection with FIG. 2. At 340 the sub-rules are evaluated in joining steps to yield newly inferred triples. The sub-rules join the results of the execution of one predicate on the new triples D with results of the execution of the other predicate on the union of old and new triples M,I,D. At 350, if any more inference rules remain to be fired, the next rule is input at 320. If there are no remaining inference rules, at 360, a set of inferred triples that result from this round of inference are returned.

At 370, duplicate triples are removed. In the illustrated method, duplicate triples generated during the firing of each inference rule are allowed to accumulate, and duplicate removal is postponed until the end of an inference round. This is acceptable because, in most cases, the number of newly inferred triples will be relatively small as compared to the number of old triples. At 380 transitive closure tables are updated. Some inference engines support transitive properties such as subClassOf. To optimize the transitive closure computation during incremental inference, the transitive closure tables are maintained through entailment. During entailment, the maintained transitive tables are joined with the relatively small number of newly inferred transitive triples in order to update the transitive closure.

Figure 4:
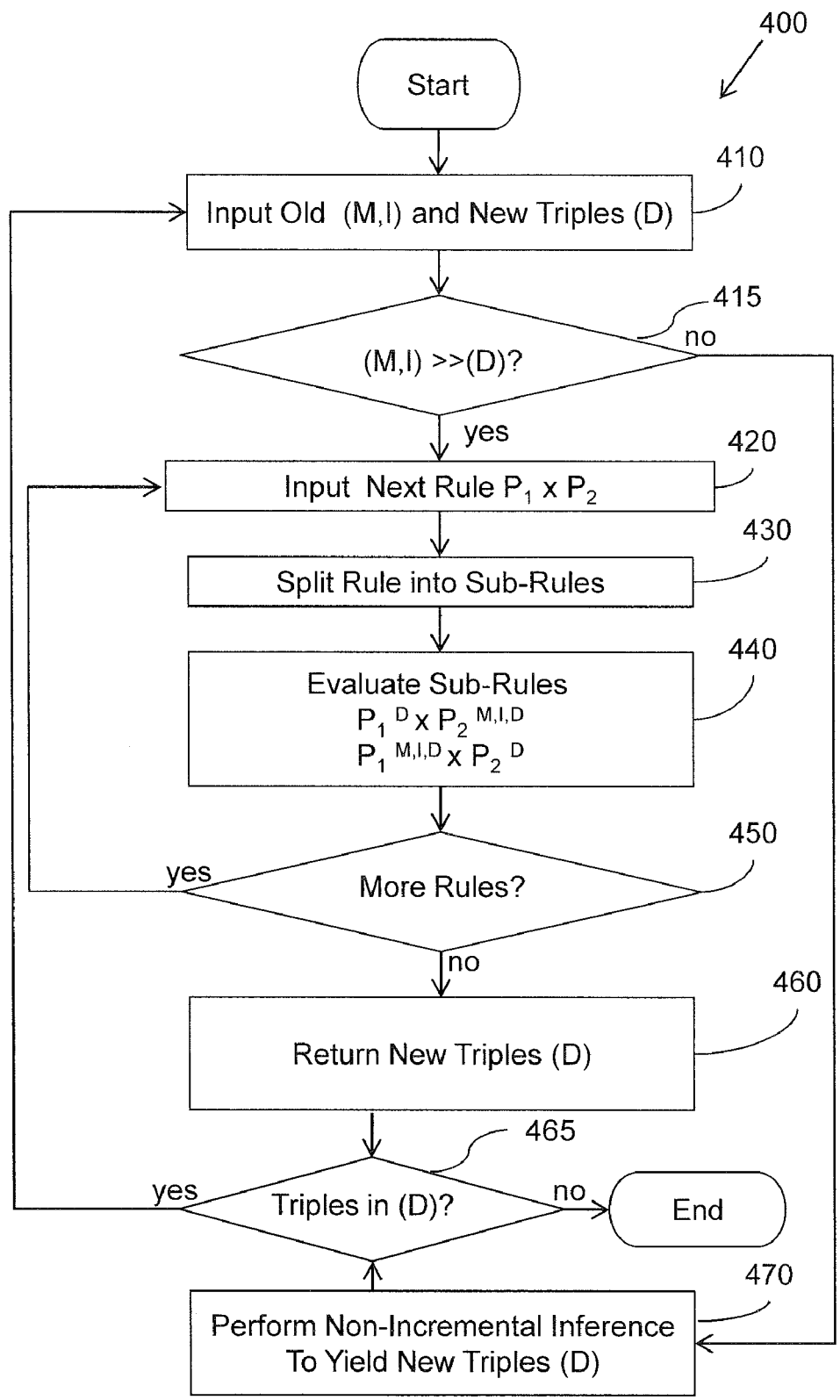
FIG. 4 illustrates another example embodiment of a method associated with incremental inference.

FIG. 4 illustrates an example embodiment of a method 400 that can be used during inference being performed from scratch. The method 400 employs the technique described in FIG. 3 while treating newly inferred triples generated by each round of inference as new triples D while triples that were part of the model prior to the round of inference are treated as old triples M,I. At 410 the old triples M,I and new triples D are input.

At 415, the number of new triples D is compared to the number of old triples M,I. This is because in early rounds of inference the number of inferred triples D could be quite large compared to the asserted model M,I. In such cases, when splitting and evaluating each rule, the same execution plan (usually consisting of hash joins) might be used which may be slower than evaluating the rule in one step. On the other hand, if the number of newly inferred triples D is small enough, the SQL optimizer may select a different execution plan where a nested loop with an index is used instead of a hash join, which could improve performance. Thus, at 315 the number of new triples D is checked to see if it is much less than the number of old triples M,I. In one example embodiment, a threshold size ratio is selected as the number triples in D being less than ten percent of the number of triples in M,I. If the number of new triples D is not small enough relative to the number of triples in M,I, non-incremental inference is performed at 465. If no new triples result from this round of non-incremental inference, the method ends.

If the number of triples in D is small enough relative to the number of triples in M,I at 420, as part of an inference round 420-450, a next inference rule is input. The rule is split into sub-rules at 430. The sub-rules include the at least two joining steps using predicates $p_1$ and $p_2$ as described above in connection with FIG. 2. At 440 the sub-rules are evaluated in joining steps to yield newly inferred triples. The sub-rules join the results of the execution of one predicate on the new triples D with results of the execution of the other predicate on the union of old and new triples M,I,D. At 450, if any more inference rules remain to be fired, the next rule is input at 420. If there are no remaining inference rules, at 460, a set of inferred triples that result from this round of inference are returned and the method ends.

While FIGS. 3 and 4 illustrate various actions occurring in serial, it is to be appreciated that various actions illustrated in FIGS. 3 and 4 could occur substantially in parallel. By way of illustration, a first process could split inference rules, a second process could process inference rules, and a third process could store inferred triples in triple storage. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes accessing one or more inference rules that are associated with a semantic model that include a first predicate joined with a second predicate. The method inputs a set of old triples that include asserted and inferred triples in a semantic model and a set of new triples. For a round of the firing of each of the one or more inference rules, newly inferred triples are generated based on the new triples. The results of execution of the first predicate on a union of the sets of old and new triples is joined with results of execution of the second predicate on the set of new triples to produce newly inferred triples. The results of execution of the first predicate on the set of new triples is joined with results of execution of the second predicate on a union of the sets of old and new triples to produce newly inferred triples. Newly inferred triples that duplicate old triples after the round of firing of the one or more inference rules are removed. Newly inferred transitive triples are joined with one or more transitive tables associated with the old triples after the round of firing of the one or more inference rules. The semantic model is updated with the newly inferred triples.

While executable instructions associated with the above method are described as being stored on a computer-readable medium, it is to be appreciated that executable instructions associated with other example methods described herein may also be stored on a computer-readable medium.

Figure 5:
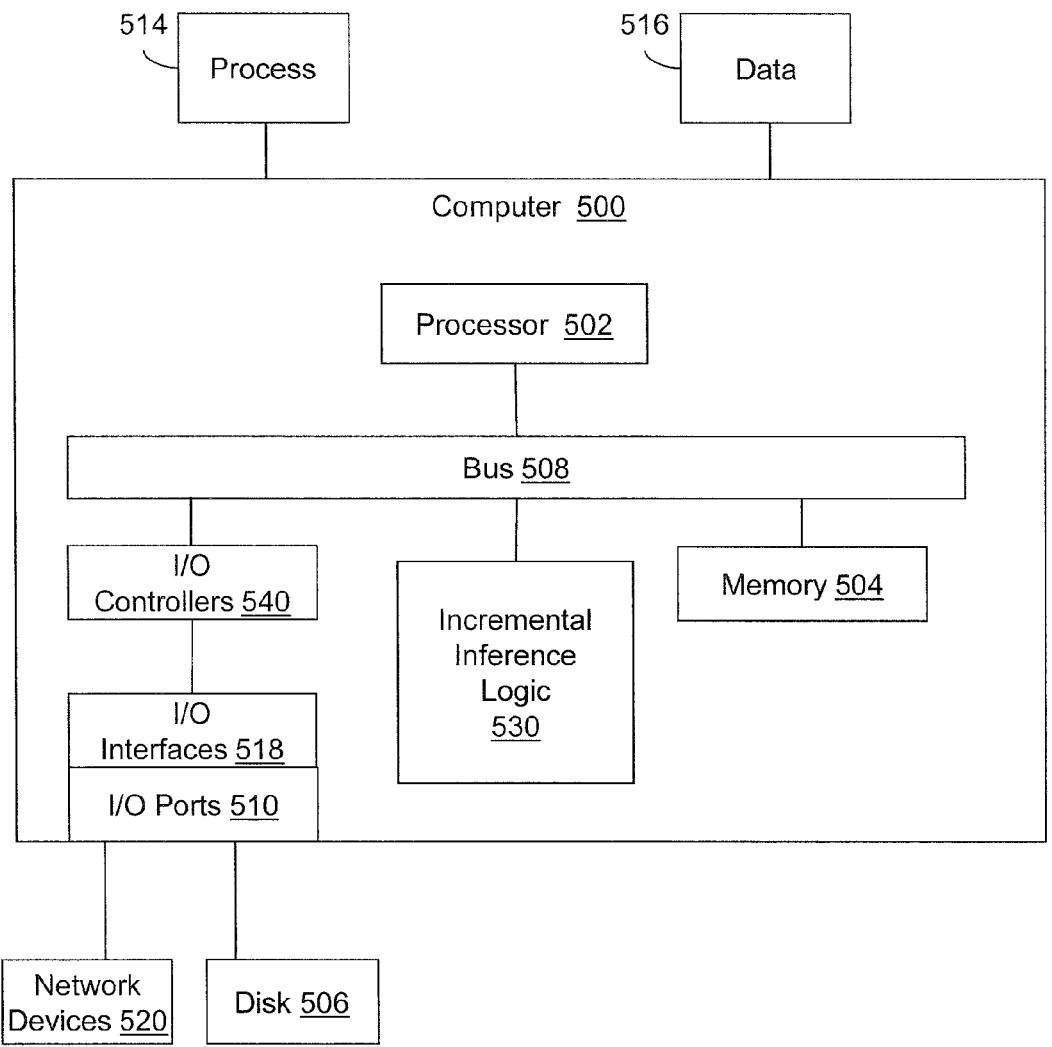
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include an incremental inference logic 530 configured to facilitate incremental inference. In different examples, the logic 530 may be implemented in hardware, software stored as computer executable instructions on a computer-readable medium, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software stored as computer executable instructions on a computer-readable medium, firmware) for accessing one or more inference rules that are associated with a semantic model, the rules including a first predicate joined with a second predicate and means (e.g., hardware, software stored as computer executable instructions on a computer-readable medium, firmware) for inputting a set of old triples that include asserted and inferred triples in a semantic model and a set of new triples.

The means may be implemented, for example, as an ASIC (application specific integrated circuit) programmed to apply a hybrid approach to equivalence reasoning. The means may also be implemented as computer executable instructions that are presented to computer 500 as data 516 that are temporarily stored in memory 504 and then executed by processor 502.

Logic 530 may also provide means (e.g., hardware, software stored as computer executable instructions on a computer-readable medium, firmware) means for generating newly inferred triples based on the new triples by joining results of execution of the first predicate on a union of the sets of old and new triples with results of execution of the second predicate on the set of new triples to produce newly inferred triples; and joining results of execution of the first predicate on the set of new triples with results of execution of the second predicate on a union of the sets of old and new triples to produce newly inferred triples. The logic may also provide means (e.g., hardware, software stored as computer executable instructions on a computer-readable medium, firmware) for updating the semantic model with the new triples.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM (compact disk) drive, a CD-R (CD recordable) drive, a CD-RW (CD rewriteable) drive, a DVD (digital versatile disk and/or digital video disk) ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCI (peripheral component interconnect), PCIE (PCI express), 1394, USB (universal serial bus), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-implemented method, comprising:
   accessing one or more inference rules that are associated with a semantic model, the rules including a first predicate joined with a second predicate;
   inputting a set of old triples that include asserted and inferred triples in a semantic model and a set of new triples;
   for a round comprising the firing of the one or more inference rules, generating newly inferred triples based on the new triples by:
      executing the first predicate on a union of the sets of old and new triples to produce a first result;
      executing the second predicate on the set of new triples to produce a second result;
      joining the first result and the second result to produce newly inferred triples;
      executing the first predicate on the set of new triples to produce a third result;
      executing the second predicate on a union of the sets of old and new triples to produce a fourth result; and
      joining the third result and the fourth result to produce newly inferred triples; and
   updating the semantic model with the newly inferred triples.

2. The computer-implemented method of claim 1 where the set of new triples are triples that have been user added as asserted triples to the semantic model.

3. The computer-implemented method of claim 1 where the set of new triples are triples that have been generated by a most recent round of firing of the one or more inference rules on triples in the semantic model.

4. The computer-implemented method of claim 3 comprising comparing a number of new triples to a number of old triples and generating newly generated triples when the number of new triples is less than a threshold percentage of the number of old triples.

5. The computer-implemented method of claim 1 comprising removing newly inferred triples that duplicate old triples after the round of firing of the one or more inference rules.

6. The computer-implemented method of claim 5 where the removing of newly inferred triples that duplicate old triples comprises performing a hash anti-join between the newly inferred triples and the old triples.

7. The computer-implemented method of claim 1 comprising joining newly inferred transitive triples with one or more transitive tables associated with the old triples after the round of firing of the one or more inference rules.

8. A computing system comprising:
   data storage that stores a semantic model comprising one or more inference rules each comprising a first predicate and a second predicate and a set of old triples comprising asserted triples and inferred triples resulting from firing of the one or more inference rules on the asserted triples; and
   an incremental inference logic configured to, for a round comprising the firing of the one or more inference rules, update the semantic model based on a set of new triples by executing the first predicate on a union of the sets of old and new triples to produce a first result; executing the second predicate on the set of new triples to produce a second result; joining the first result and the second result to produce newly inferred triples; executing the first predicate on the set of new triples to produce a third result; executing the second predicate on a union of the sets of old and new triples to produce a fourth result; and joining the third result and the fourth result to produce newly inferred triples; and adding the newly inferred triples to the semantic model.

9. The computing system of claim 8 where the incremental inference logic acts on a set of new triples that are user added triples that have been added as asserted triples to the semantic model.

10. The computing system of claim 8 where the incremental inference logic acts on a set of new triples that have been generated by a most recent round of firing of the one or more inference rules on triples in the semantic model.

11. The computing system of claim 10 where the incremental inference logic compares a number of new triples to a number of old triples and generates newly generated triples when the number of new triples is less than a threshold percentage of the number of old triples.

12. The computing system of claim 8 where the incremental inference logic removes newly inferred triples that duplicate old triples after the round of firing of the one or more inference rules.

13. The computing system of claim 12 where the incremental inference logic removes newly inferred triples that duplicate old triples by performing a hash anti-join between the newly inferred triples and the old triples.

14. The computing system of claim 8 where the incremental inference logic joins newly inferred transitive triples with one or more transitive tables associated with the old triples after the round of firing of the one or more inference rules.

15. A non-transitory computer-readable medium storing computer executable instructions that when executed by a computer cause the computer to perform a method, the method comprising:

accessing one or more inference rules that are associated with a semantic model, the rules including a first predicate joined with a second predicate;

inputting a set of old triples that include asserted and inferred triples in a semantic model and a set of new triples;

for a round comprising the firing of each of the one or more inference rules, generating newly inferred triples based on the new triples by:

executing the first predicate on a union of the sets of old and new triples to produce a first result;

executing the second predicate on the set of new triples to produce a second result;

joining the first result and the second result to produce newly inferred triples;

executing the first predicate on the set of new triples to produce a third result;

executing the second predicate on a union of the sets of old and new triples to produce a fourth result: and joining the third result and the fourth result to produce newly inferred triples;

removing newly inferred triples that duplicate old triples after the round of firing of the one or more inference rules; and joining newly inferred transitive triples with one or more transitive tables associated with the old triples after the round of firing of the one or more inference rules; and updating the semantic model with the newly inferred triples.

16. The computer-readable medium of claim 15 where the removing of newly inferred triples that duplicate old triples comprises performing a hash anti-join between the newly inferred triples and the old triples.

17. The computer-readable medium of claim 15 where the method comprises inputting a set of user added triples that have been added as asserted triples to the semantic model.

18. The computer-readable medium of claim 15 where the method comprises inputting a set of new triples that have been generated by a most recent round of firing of the one or more inference rules on triples in the semantic model.

19. The computer-readable medium of claim 18 where the method comprises comparing a number of new triples to a number of old triples and generating newly generated triples when the number of new triples is less than a threshold percentage of the number of old triples.

20. A system, comprising:

means for accessing one or more inference rules that are associated with a semantic model, the rules including a first predicate joined with a second predicate;

means for inputting a set of old triples that include asserted and inferred triples in a semantic model and a set of new triples;

means for generating newly inferred triples based on the new triples by:

executing the first predicate on a union of the sets of old and new triples to produce a first result;

executing the second predicate on the set of new triples to produce a second result;

joining the first result and the second result to produce newly inferred triples;

executing the first predicate on the set of new triples to produce a third result;

executing the second predicate on a union of the sets of old and new triples to produce a fourth result: and joining the third result and the fourth result to produce newly inferred triples; and means for updating the semantic model with the newly inferred triples.

21. A non-transitory computer-readable medium storing computer executable instructions that when executed by a computer cause the computer to perform a method, the method comprising:

accessing one or more inference rules that are associated with a semantic model, the rules including a first predicate joined with a second predicate;

inputting a set of old triples that include asserted and inferred triples in a semantic model and a set of new triples;

for a round comprising the firing of the one or more inference rules, generating newly inferred triples based on the new triples by:

executing the first predicate on a union of the sets of old and new triples to produce a first result;

executing the second predicate on the set of new triples to produce a second result;

joining the first result and the second result to produce newly inferred triples;

executing the first predicate on the set of new triples to produce a third result;

executing the second predicate on a union of the sets of old and new triples to produce a fourth result; and joining the third result and the fourth result to produce newly inferred triples; and updating the semantic model with the newly inferred triples.

22. The computer-readable medium of claim 21 where the set of new triples are triples that have been user added as asserted triples to the semantic model.

23. The computer-readable medium of claim 21 where the set of new triples are triples that have been generated by a most recent round of firing of the one or more inference rules on triples in the semantic model.

24. The computer-readable medium of claim 23 where the method comprises comparing a number of new triples to a number of old triples and generating newly generated triples when the number of new triples is less than a threshold percentage of the number of old triples.

25. The computer-readable medium of claim 21 where the method comprises removing newly inferred triples that duplicate old triples after the round of firing of the one or more inference rules.

26. The computer-readable medium of claim 25 where the method comprises removing newly inferred triples that duplicate old triples by performing a hash anti-join between the newly inferred triples and the old triples.

27. The computer-readable medium of claim 21 where the method comprises joining newly inferred transitive triples with one or more transitive tables associated with the old triples after the round of firing of the one or more inference rules.

* * * * *

UNITED STATES PATENT AND TRADEMARK OFFICE
CERTIFICATE OF CORRECTION

PATENT NO. : 8,250,106 B2  
APPLICATION NO. : 12/620857  
DATED : August 21, 2012  
INVENTOR(S) : Kolovski et al.

Page 1 of 1

It is certified that error appears in the above-identified patent and that said Letters Patent is hereby corrected as shown below:

On title page, in column 2, under "Abstract", line 9, before "the second" insert -- of --.

On title page, in column 2, under "Abstract", line 13, before "the second" insert -- of --.

In column 11, line 19, in Claim 15, delete "result:" and insert -- result; --, therefor.

In column 12, line 4, in Claim 20, delete "result:" and insert -- result; --, therefor.

Signed and Sealed this
Eighteenth Day of December, 2012

David J. Kappos
*Director of the United States Patent and Trademark Office*